United States Patent [19]
Cherrette et al.

[11] Patent Number: 5,870,063
[45] Date of Patent: Feb. 9, 1999

[54] SPACECRAFT WITH MODULAR COMMUNICATION PAYLOAD

[75] Inventors: Alan Ralph Cherrette, Plainsboro; Bronson Murray, Freehold, both of N.J.

[73] Assignee: Lockheed Martin Corp., East Windsor, N.J.

[21] Appl. No.: 622,724

[22] Filed: Mar. 26, 1996

[51] Int. Cl.$^6$ ................................................. H01Q 21/00
[52] U.S. Cl. ............................. 343/85.3; 343/700 MS; 343/DIG. 2; 342/354
[58] Field of Search .................... 343/701, 700 MS, 343/771, 853, 872, 915, DIG. 2; 342/354; 455/13.3

[56] References Cited

U.S. PATENT DOCUMENTS

| | | | |
|---|---|---|---|
| 4,343,005 | 8/1982 | Han et al. | 343/DIG. 2 |
| 4,380,013 | 4/1983 | Slysh | 343/DIG. 2 |
| 4,581,614 | 4/1986 | LaCourse | 343/368 |
| 4,987,425 | 1/1991 | Zahn et al. | 343/853 |
| 5,087,920 | 2/1992 | Tsurumaru et al. | 343/700 |
| 5,128,689 | 7/1992 | Wong et al. | 343/853 |
| 5,160,936 | 11/1992 | Braun et al. | 343/725 |
| 5,215,824 | 6/1993 | Munro et al. | 343/872 X |
| 5,223,850 | 6/1993 | Branigan et al. | 343/771 |
| 5,283,592 | 2/1994 | Bugorad et al. | 343/DIG. 2 X |
| 5,293,171 | 3/1994 | Cherrette | 343/700 |
| 5,327,150 | 7/1994 | Cherrette | 343/771 |
| 5,355,138 | 10/1994 | Cances et al. | 342/354 |
| 5,400,036 | 3/1995 | Kochiyama et al. | 342/354 X |

OTHER PUBLICATIONS

"V–Band, Space–Based Phased Arrays", Kinzel et al., pp. 89–102, Microwave Journal, Jan. 1987.

Primary Examiner—Donald T. Hajec
Assistant Examiner—Tho Phan
Attorney, Agent, or Firm—W. H. Meise; C. A. Berard; S. A. Young

[57] ABSTRACT

A spacecraft of a set of spacecraft has an antenna support frame defining square apertures, which are the same size in all spacecraft of the set of spacecraft. The set also includes a plurality of radiating tiles for various operating frequencies. The tiles all have the same dimensions, so that any combination of tiles may be mounted in the apertures of the frames of any spacecraft to form antenna arrays of various sizes, depending upon the customer's requirements. Each tile includes plural beamformers and power amplifiers, and remotely controllable phase shifters and level controls, for ready reconfiguration of the antennas while the spacecraft is in operation. The preferred dimension of each radiating tile is a one-foot square.

12 Claims, 14 Drawing Sheets

SPACECRAFT WITH MODULAR COMMUNICATION PAYLOAD

FIELD OF THE INVENTION

This invention relates to modular spacecraft, and more particularly to spacecraft having antennas which are constructed with modular elements, for ready interchangeability and configuring.

BACKGROUND OF THE INVENTION

Communication spacecraft are widely used for communicating between earth stations, and are becoming more important for communications in regions of the world where other communication paths are not available. Ordinary geosynchronous spacecraft at their present state of development require expenditure of propellant in order to aid in maintaining their attitude andor station. When the propellant is exhausted, the utility of the spacecraft is ended, and a new spacecraft must be launched to take over the communication function. Thus, there is a substantial industry which engages in fabrication and launch of spacecraft, both for new communications functions, and to replace spacecraft which become inoperable.

The fabrication and launch of communication spacecraft has in the past been very costly, at least in part because each spacecraft was custom-designed and built for a particular use. Some attention has been directed to reducing cost in the fabrication of spacecraft by using common elements in spacecraft of a series of spacecraft. Thus, the dimensions of a spacecraft and of key portions thereof are increased in five-inch increments, as described in U.S. Pat. No. 5,344,104, issued Sep. 6, 1994 in the name of Homer et al., and common polygonal spacecraft shapes are described in U.S. Pat. No. 5,411,226, issued May 2, 1995 in the name of Jones et al. Aspects of each spacecraft which are unique to the particular mission which it is to serve have been more resistant to modularization. Thus, the attitude control and stationkeeping system must maintain the spacecraft in a particular attitude at a particular station, and must be adapted to that station. Similarly, the number of transponder channels, and their frequencies and power, tend to differ from one spacecraft to the next, and the configurations of the transmitters and channelizing arrangements differ correspondingly. The antenna footprint and operating frequencies also tend to differ from one spacecraft to the next, and antennas are ordinarily custom-designed. All these custom designs require the attention of skilled engineers, and fabrication of the custom design is expensive, and requires extensive testing, all of which increases the lead time.

Improved spacecraft are desired.

SUMMARY OF THE INVENTION

Each spacecraft of a set of spacecraft according to the invention includes a body, and a source of electrical power mounted on the body. The body of each of the spacecraft includes a support frame, which comprises a plurality of elongated support beams in first and second mutually orthogonal sets, joined together to form a substantially planar grid defining an array of substantially identical rectangular apertures. The sizes of the rectangular apertures are identical from one spacecraft of the set to another. A first spacecraft of the set or spacecraft includes a first set of substantially planar, rectangular, first tiles. Each of the first tiles defines first and second broad sides and four edges, and each tile of the first set of tiles is dimensioned to fit within any one of the rectangular apertures of the frame of any spacecraft of the set of spacecraft. Each of the first tiles includes an antenna arrangement which is adapted for electromagnetic radiation from the first side of the tile within a first frequency band. Each of the first tiles includes an electromagnetic signal input port, preferably on the second broad side, for receiving signals within the first frequency band, and also includes a power RF, microwave, millimeterwave or other electromagnetic amplifier for amplifying signals within the first frequency band, a coupling arrangement coupled to the amplifier and to the electromagnetic signal input port, for coupling signals which are applied to the electromagnetic signal input port to the amplifier for amplification, and a reject filter arrangement coupled to the amplifier and to the antenna arrangement, for coupling amplified signals from the amplifier to the antenna arrangement, and for rejecting signal components at reject frequencies other than the first frequency band. The amplifier of each of the first tiles is thermally coupled to at least one of the first and second sides of the tile for radiation of thermal energy into space therefrom to aid in temperature control. Each of the tiles of the first set of tiles is mounted within one of the apertures in the frame of the first spacecraft, with at least one edge of each of the tiles of the first set of tiles adjacent to another tile of the first set of tiles, to thereby form an active array which includes the antenna arrangements of the first set of tiles. The first spacecraft also includes a second set of substantially planar, rectangular, second tiles. Each of the second tiles defines first and second broad sides and four edges, and is dimensioned to fit within any one of the rectangular apertures of the frame of any spacecraft of the set of spacecraft. Each of the second tiles includes an antenna arrangement which is adapted for radiation from the first side of the tile within a second frequency band. Each of the second tiles includes an electromagnetic signal input port for receiving signals within the second frequency band, an amplifier for amplifying signals within the second frequency band, a coupling arrangement coupled to the amplifier and to the electromagnetic signal input port for coupling those signals which are applied to the input port to the amplifier, in which the signals are amplified, and a reject filter arrangement coupled to the amplifier and to the antenna arrangement, for coupling amplified signals from the amplifier to the antenna arrangement, and for rejecting signal components at reject frequencies other than the second frequency band. The amplifier of each of the second tiles is thermally coupled to at least one of the first and second sides of its associated second tile, for radiation of thermal energy therefrom. Each of the tiles of the second set of tiles is mounted within one of the apertures in the frame of the first spacecraft, with at least one edge of each of the tiles of the second set of tiles adjacent to another tile of the second set of tiles, to thereby form an active array which includes the antenna arrangement of the second set of tiles. The first spacecraft further includes a source of first electromagnetic signals within the first frequency band, and a source of second signals within the second frequency band. The first and second signals are to be transmitted. The first spacecraft further includes a first power divider with an input port coupled to the source of first signals. The first power divider includes a plurality of output ports, each of which is coupled to the electromagnetic signal input port of one of the tiles of the first set of tiles. The first spacecraft also includes a second power divider with an input port coupled to the source of second signals, and with a plurality of output ports, each of the which is coupled to an the electromagnetic signal input port of one of the tiles of the second set of tiles. The first spacecraft further includes an electrical power distributing arrangement coupled to the source of electrical power and to each of the tiles, for providing energizing power for the amplifier. In a preferred embodiment of the invention, the rectangular apertures in the frame are square, and the tiles are also square, so that the tiles may be mounted with either of two mutually orthogonal linear polarizations. The tiles preferably has a minimum ratio of side to thickness of 10, and in one embodiment have 12-inch sides. In another embodiment of the invention, the radiation associated with the first tile of the first spacecraft is in a first polarization, and the radiation associated with the second tile is in a second polarization, orthogonal to the first polarization. The frequency of operation of a tile may be within or include C-band, L-band, X-band, or any of the K bands, or combinations thereof. Mutually adjacent tiles in the frame may operate within the same frequency band, or at different frequency bands. The electrical power distribution arrangement may distributes the electrical power at a distribution voltage which exceeds that required by the amplifier, and each of the tiles may in that case include a voltage reducer coupled to the power distribution and to the amplifier, for reducing the distribution voltage to a lower voltage for application to the amplifier. Those skilled in the art know that this may be done in a linear manner, but that a switching voltage converter tends to have lower energy or power losses.

Another embodiment of the invention includes receive-only tiles having the same overall dimensions as the transmit tiles, so that the frame can also carry an array of receive-only tiles. Unlike the transmit tiles, the receive-only tiles have the thermal problem of generating too little heat to keep their temperature within an acceptable operating range, because their amplifiers are low-noise, rather than high-power. The low-noise amplifiers generate or dissipate significantly less heat than the power amplifiers, and the broad, heat-radiating sides of the receive-only tiles tend to radiate to space. According to an aspect of the invention, the receive-only tiles are fitted with thermal blankets to aid in reflecting energy back to the tile.

BRIEF DESCRIPTION OF THE DRAWING

FIG. 10a is a more detailed view of a portion of the arrangement of FIG. 9, and FIG. 10b illustrates the reverse side of the arrangement of FIG. 10a;

DESCRIPTION OF THE INVENTION

Figure 1:
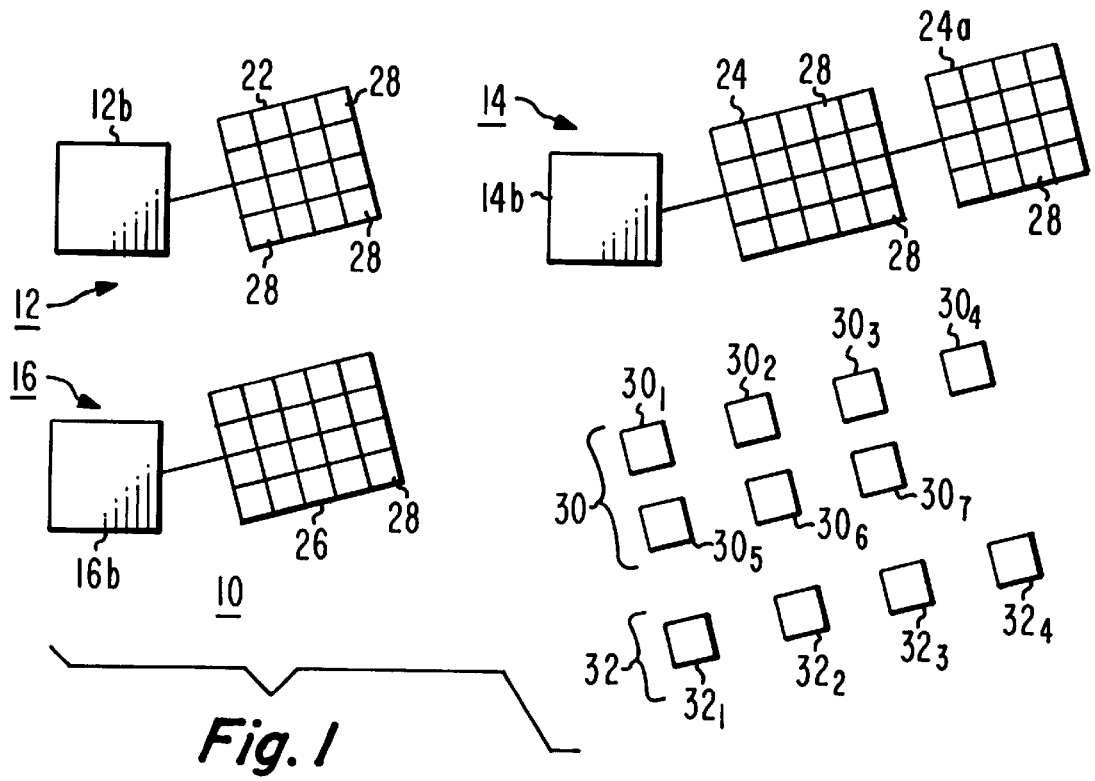
FIG. 1 illustrates a set of spacecraft, each including a body and a tile mounting frame, and also illustrates sets of radiating tiles adapted to fit within the apertures of the frames of the various spacecraft of the set of spacecraft.

In FIG. 1, a set 10 of spacecraft includes individual spacecraft 12, 14, and 16. Each spacecraft 12, 14, and 16 includes a body 12b, 14b, and 16b, respectively, and a substantially planar antenna tile support frame 22, 24, and 26, respectively. As illustrated, spacecraft 14 includes a further antenna tile support frame 24a. Each antenna tile support frame includes a plurality of elongated support elements or beams, described in more detail below, which define rectangular, or preferably square, planar apertures, some of which are designated 28. In addition, FIG. 1 illustrates a first set 30 of electromagnetic radiating tiles. Set 30 includes seven tiles $30_1$, $30_2$, $30_3$, $30_4$, $30_5$, $30_6$, and $30_7$, which, as described below, are all optimized to operate within a particular first frequency range. Another set 32 of radiating tiles includes four tiles $34_1$, $34_2$, $34_3$, $34_4$, which are optimized for operation in (or at) a second frequency range, which is different from the first frequency range. As an example of different operating frequencies, set of tiles 30 might be optimized for operation at C-band, which a the frequency range of about four gigahertz (GHz), while tiles of set 32 might be optimized for $K_u$ band, which is in the range of about 12 GHz. According to an aspect of the invention, each tile of sets 30 and 32 has the same dimensions, which are selected to fit within the apertures 28.

Figure 2:
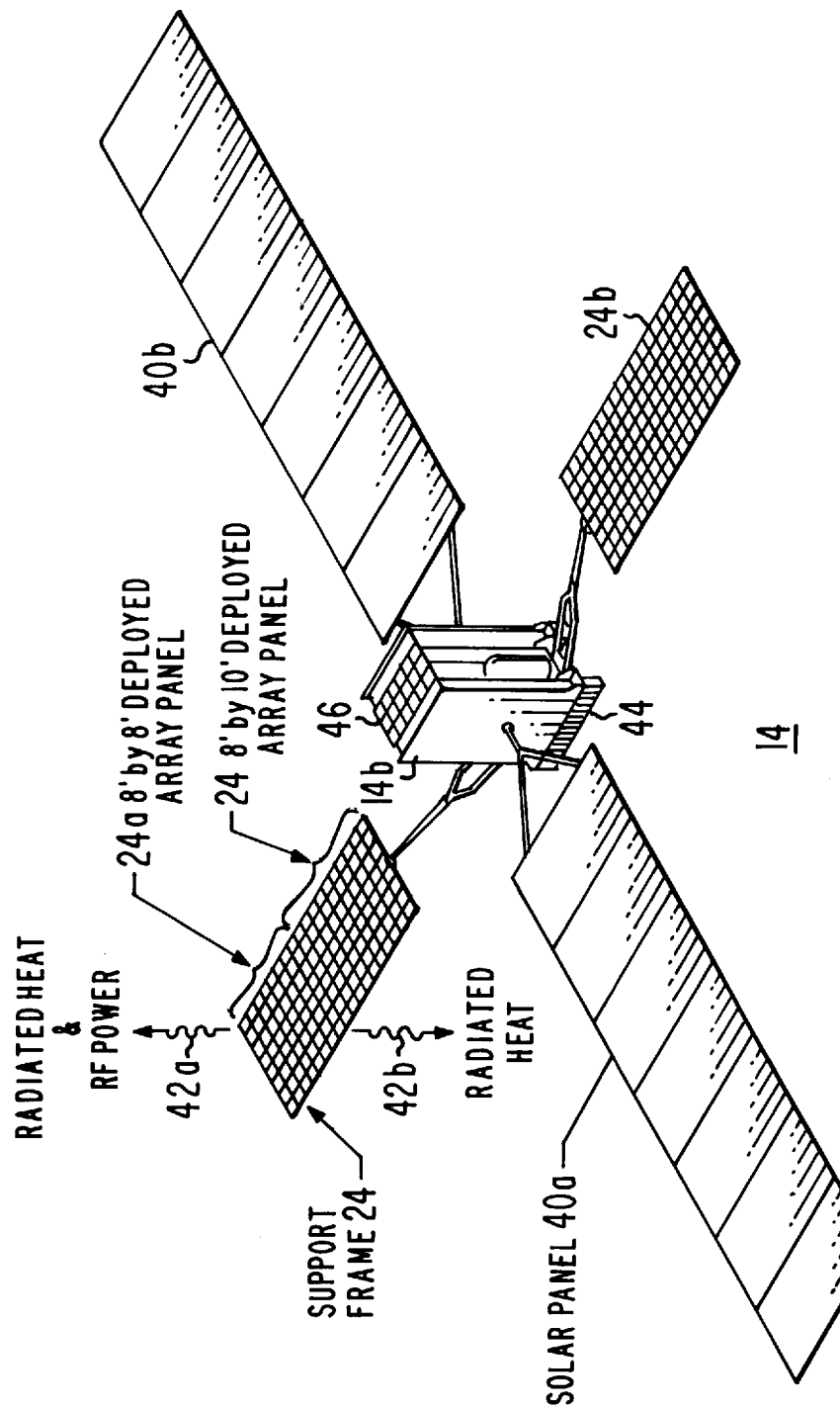
FIG. 2 is a more detailed overall view of spacecraft 12 of FIG. 1, illustrating solar panels for generating electrical power for operation of the spacecraft, a set of batteries for storage of energy for those periods in which the spacecraft is in shadow, and also illustrating unfurled panels of antenna frames.

FIG. 2 is a more detailed view of spacecraft 14 of the set of FIG. 1. In FIG. 2, spacecraft 14 illustrates deployed antenna panel 24 as being an 8-foot by ten-foot (8×10) array, while antenna panel 24a is 8×8. A further deployed antenna panel arrangement is designated 24b. FIG. 2 also illustrates deployed solar panels 40a and 40b, which produce electrical energy in known fashion, which is stored in an electrical battery 44 for satisfying peak loads and for those intervals in which the solar panels may be in shadow. A further antenna array 46 is illustrated as being mounted on the nadir side of body 14b of spacecraft 14. One advantage of panel antennas according to the invention is that electromagnetic energy (which may be termed microwave or RF) and heat energy can be radiated from the earth-facing sides of the antenna panels, as suggested by photon arrow symbol 42a, and heat energy can be radiated from the reverse side, as suggested by photon arrow symbol 42b. It is very advantageous to be able to stow large antenna panels such as those illustrated in FIG. 2 against the sides of body 14b during high-acceleration intervals, such as launch, and then deploy them to the illustrated configuration, in which ability to radiate heat from both sides of the antenna panel aids in maintaining temperature when the antenna panels include active elements.

Figure 3:
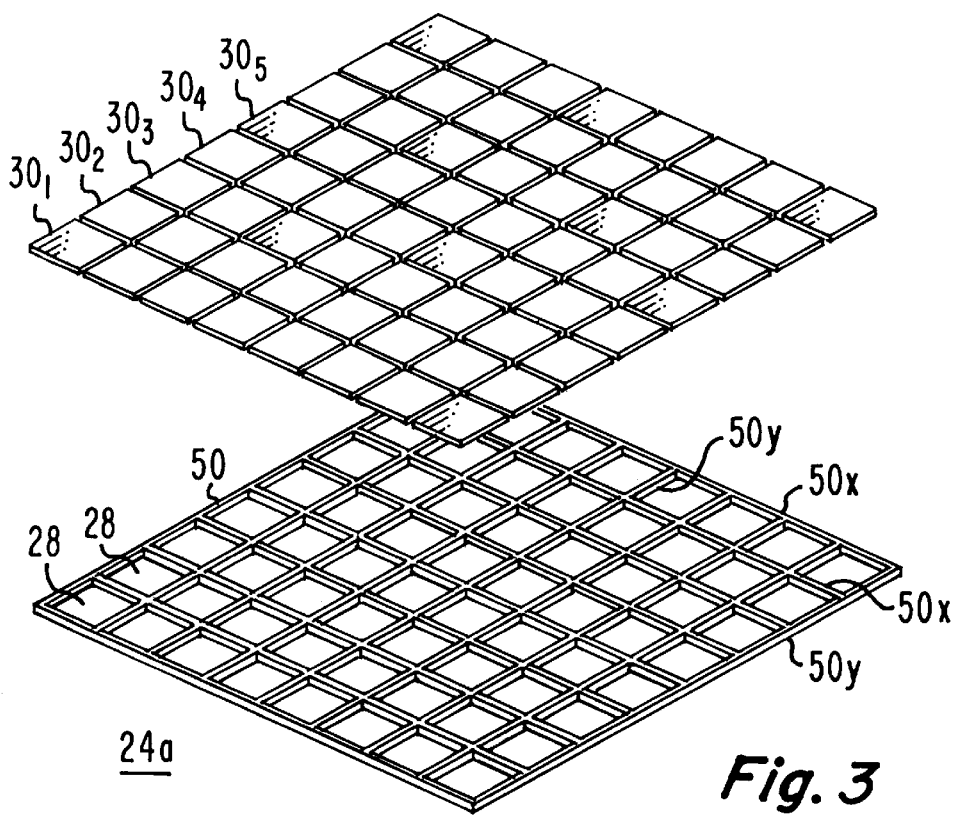
FIG. 3 is a perspective or isometric view of antenna panel 24a of FIG. 2, with the individual radiating tiles exploded away from their support frame to illustrate the shape and relative dimensions of the tiles and the corresponding apertures in the frame.

FIG. 3 is a perspective or isometric view of 8×8 antenna panel 24a of FIG. 2, with the individual radiating tiles exploded away from their support frame to illustrate the shape and relative dimensions of the tiles and the corresponding apertures in the frame. In FIG. 3, frame 50 includes a plurality of elongated beams or support members 50x, 50y which intersect to define a substantially planar array of square apertures 28. An 8×8 array of radiating tiles including tiles $30_1$, $30_2$, $30_3$, $30_4$, and $30_5$. Tiles $30_1$, $30_2$, $30_3$, $30_4$, and $30_5$ are square, and are dimensioned to fit within apertures 28 in frame 50. The tiles may be held within the apertures in any manner, but preferably are held at their edges, so that the tile mounting arrangement does not interfere with the RF or heat radiation. A particularly advantageous mounting arrangement is described in a copending patent application Ser. No. 08/622,725 entitled "Modular Supertile Array Antenna", filed Mar. 26, 1996 in the name of Murray et al.

Figure 4:
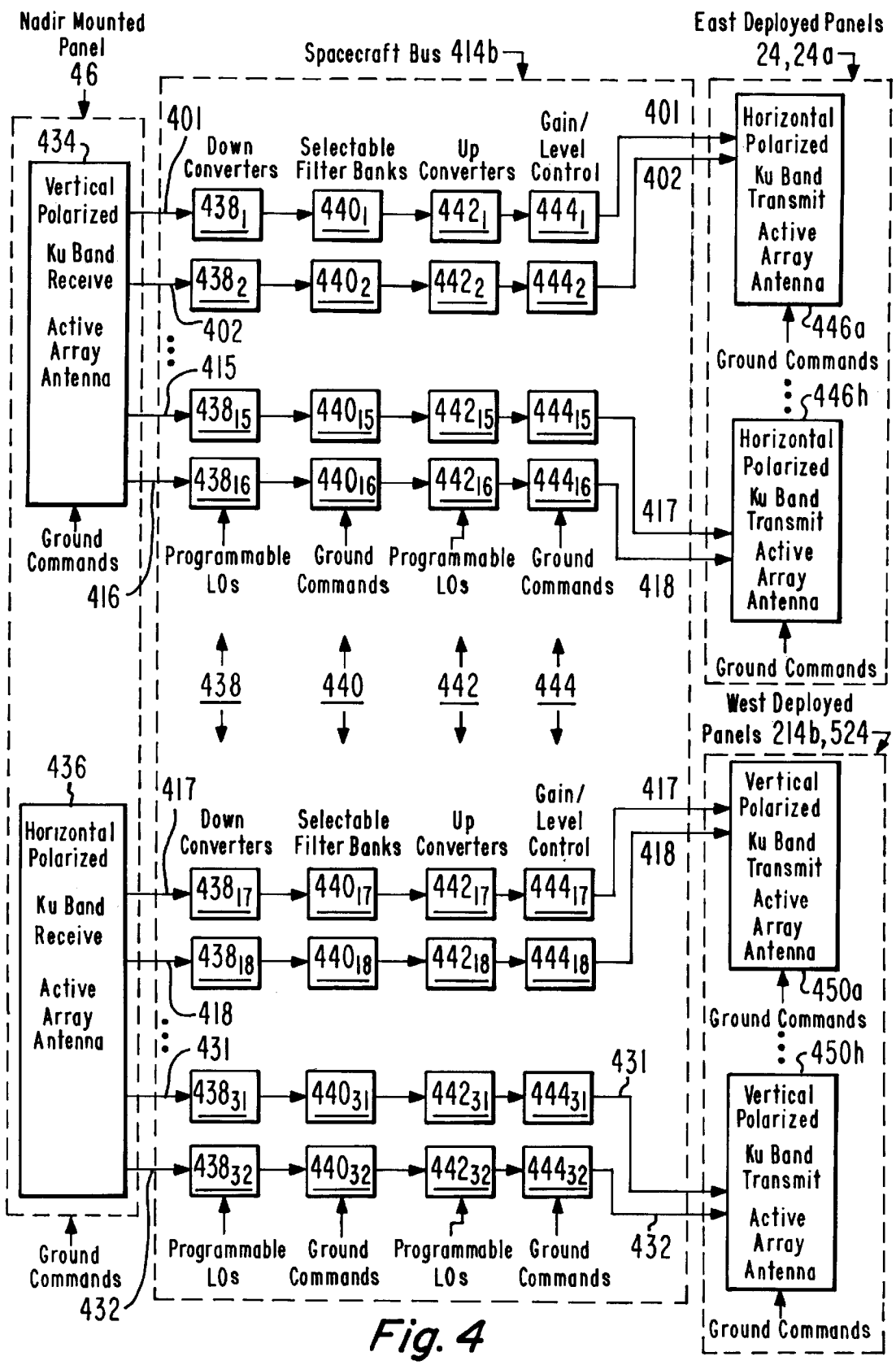
FIG. 4 is a simplified block diagram of a $K_u$ band communication system for use on a spacecraft.

FIG. 4 is a simplified block diagram of a $K_u$ band communication system for use on a spacecraft. In FIG. 4, a first nadir panel mounted vertically polarized receive antenna array 434 produces sixteen beams at sixteen different frequencies within the $K_u$ band, and a horizontally polarized receive antenna array 436 produces sixteen beams at sixteen different frequencies, also within the $K_u$ band. As described below, each receive antenna tile, in this particular embodiment of the invention, is capable of receiving sixteen signals over sixteen separate beams. As known to those skilled in the art, the sixteen frequencies received by antenna array 434 may be distinctly different from the sixteen frequencies received by antenna array 436, or each frequency of the sixteen received by antenna array 434 may overlap the frequency of one of the sixteen frequencies received by antenna array 436. When the frequencies are distinctly different, antenna array 434 produces or carries sixteen channels, which are designated 401, 402, . . . , 415, and 416, and antenna array 436 also carries sixteen channels which are designated 417, 418, . . . , 431, and 432, and thus there are a total of thirty-two channels through which independent signals can be carried. Those skilled in the art know that, even when the carrier frequencies partially overlap, polarization separation of the vertical and horizontal polarizations of antenna arrays 434 and 436 permits carrying independent signals, and thus thirty-two channels are still available.

Each of the thirty-two received signals produced at the output ports of receive antenna arrays 434 and 436 of FIG. 4 is processed through an independent channel 401, 402, . . . 431, and 432. Each channel 401, 402, . . . 431, and 432 includes a down-converter of a set or array 438 of down-converters, for converting the information signal to an intermediate carrier frequency (IF), a filter, of a set or array of filters 440, for suppressing unwanted signals from adjacent channels, and an up-converter of a set of up-converters 442, for converting the filtered signals to the transmitter frequency, and gain or level controls of a set 444, which control the amplitudes of the signals applied to the active transmit antenna arrays, to maintain the active devices or amplifiers of the active arrays operating in or near their linear region. For example, the signal on channel 401 leaves vertically polarized receive antenna 434, and flows to a down-converter $438_1$, where it is down-converted to an IF. The IF signal from down-converter $438_1$, is applied through a filter $440_1$, of an array 440 of filters, to an up-converter $442_1$. The up-converted signal is applied from up-converter $442_1$, to gain or level controls illustrated as a block $444_1$. Gain control $444_1$, is part of an array 444 of such level controls. From gain/level controls $444_1$, the processed signals flow to one of two input ports of a horizontally polarized $K_u$ active transmit antenna array 446a, which is mounted on deployed antenna panel 24a Similarly, the signal on channel 402 leaves vertically polarized receive antenna 434, and flows to a down-converter $438_2$, where it is down-converted to an IF. The IF signal from down-converter $438_2$ is applied through a filter $440_2$ to an up-converter $442_2$. The up-converted signal is applied from up-converter $442_2$ to gain or level controls illustrated as a block $444_2$. From gain/level controls $444_2$, the processed signals flow to the other one of the two input ports of horizontally polarized $K_u$ active transmit antenna array 446a. Also, the signal on channels 415 and 416 leave vertically polarized receive antenna 434, and flow to down-converters $438_{15}$ and $438_{16}$, where they are down-converted to IF. The IF signals from down-converters $438_{15}$ and $438_{16}$ are applied through filters $440_{15}$ and $440_{16}$ to up-converters $442_{15}$ and $442_{16}$. The up-converted signals are applied from up-converters $442_{15}$ and $442_{16}$ to gain or level controls illustrated as a blocks $444_{15}$ and $444_{16}$. From gain/level control blocks $444_{15}$ and $444_{16}$, the processed signals each flow to one of the two input ports of horizontally polarized $K_u$ active transmit antenna array 446h. The other channels produced by vertically polarized receive antenna 434 are not expressly illustrated, nor are the six horizontally-polarized transmit array antennas (446b, 446c, 446d, 446e, 446f, 446g) lying between illustrated antennas 446a and 446h.

Similarly, in FIG. 4, the signal on channel 417 leaves horizontally polarized receive antenna 436, and flows to a down-converter $438_{17}$, where it is down-converted to an IF. The IF signal from down-converter $438_{17}$ is applied through a filter $440_{17}$ to an up-converter $442_{17}$. The up-converted signal is applied from up-converter $442_{17}$ to gain or level controls illustrated as a block $444_{17}$. From gain/level controls $444_{17}$, the processed signals flow to one of two input ports of a vertically polarized $K_u$. active transmit antenna array 450a, which is mounted on deployed antenna panel 24b Similarly, the signal on channel 418 leaves horizontally polarized receive antenna 436, and flows to a down-converter $438_{18}$, where it is down-converted to an IF. The IF signal from down-converter $438_{18}$ is applied through a filter $440_{18}$ to an up-converter $442_{18}$. The up-converted signal is applied from up-converter $442_{18}$ to gain or level controls illustrated as a block $444_{18}$. From gain/level controls $444_{18}$, the processed signals flow to the other one of the two input ports of vertically polarized $K_u$ active transmit antenna array 450a. Also, the signals on channels 431 and 432 leave horizontally polarized receive antenna 436, and flow to down-converters $438_{31}$ and $438_{32}$, where they are down-converted to IF. The IF signals from down-converters $438_{31}$ and $438_{32}$ are applied through filters $440_{31}$ and $440_{32}$ to up-converters $442_{31}$ and $442_{32}$. The up-converted signals are applied from up-converters $442_{31}$ and $442_{32}$ to gain or level controls illustrated as blocks $444_{31}$ and $444_{32}$. From gain/level control blocks $444_{31}$ and $444_{32}$, each of the processed signals flows to one of the two input ports of vertically polarized $K_u$ active transmit antenna array 450h. Other receive output signals on channels lying between channel 418 and 431 are processed similarly, and the resulting processed signals are applied to the input port pairs of other vertically polarized transmit antenna arrays lying between arrays 450a and 450h.

Figure 5:
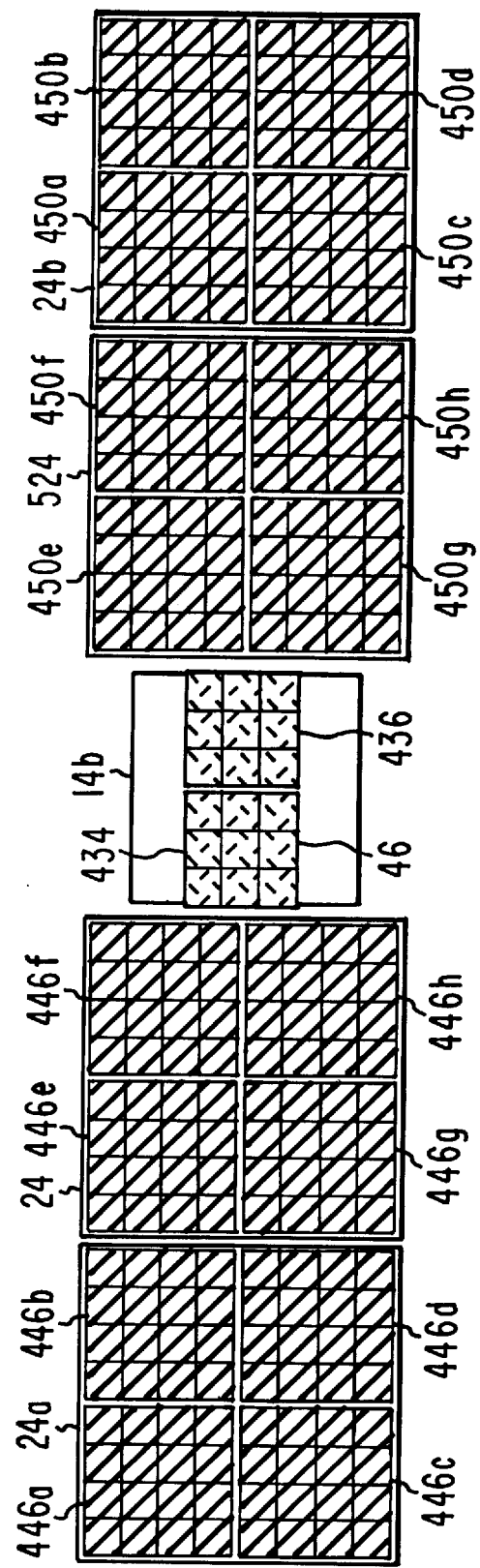
FIG. 5 is a simplified view of the nadir side of the spacecraft of FIG. 2, showing the deployed antenna panels, and antenna arrays which may be used with the arrangement of FIG. 4.

FIG. 5 is a view of the nadir side of the spacecraft body 14b, illustrating how the 3×3 $K_u$-band vertical and horizontal receive antenna arrays 434 and 436 of FIG. 4 may be arranged. As mentioned above, each receive tile is capable of receiving sixteen separate channels on sixteen beams. FIG. 5 also illustrates four eight-by-eight arrays of $K_u$ transmit tiles, namely East arrays 24, 24a, and West arrays 24b and 524. Array 24a is subdivided into four vertically polarized 4×4 subarrays 446a, 446b, 446c, and 446d, of sixteen tiles each, array 24 is subdivided into four vertically polarized 4×4 subarrays 446e, 446f, 446g, and 446h, of sixteen tiles each, array 24b is subdivided into four horizontally polarized 4×4 subarrays 450a, 450b, 450c, and 450d, of sixteen tiles each, and array 524 is subdivided into four horizontally polarized 4×4 subarrays 450e, 450f, 450g, and 450h, each of sixteen tiles. Altogether, there are sixteen 4×4 transmit tile subarrays in the arrangement of FIG. 5.

Figure 6:
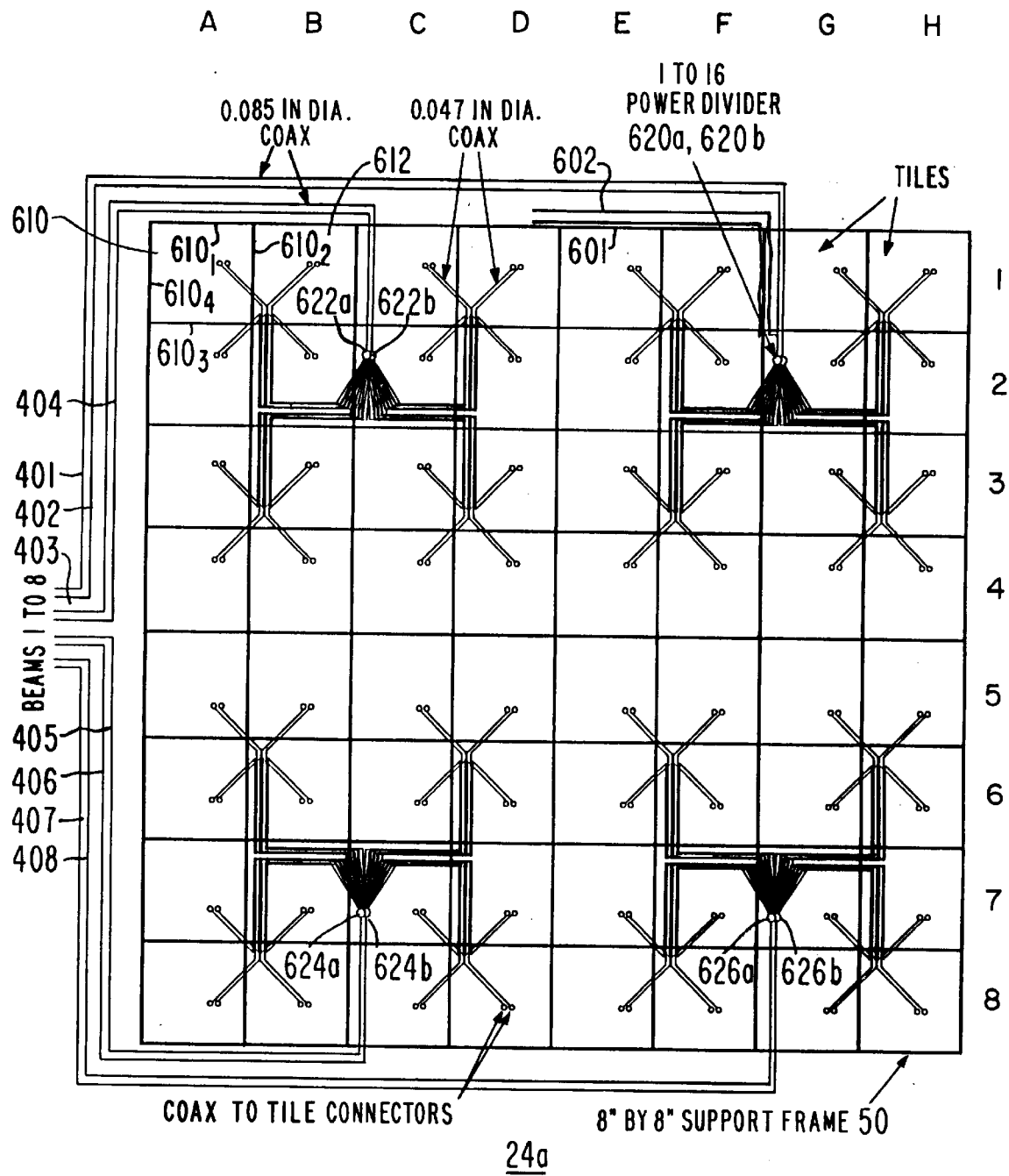
FIG. 6 is a simplified view of the RF feed connections to the radiating tiles of antenna panel 24a of FIG. 5.

FIG. 6 is a simplified view of the RF feed connections to the sixty-four radiating tiles of 8×8 transmit antenna panel 24a of FIG. 4. In FIG. 6, each individual tile is identified by its row and column. For example, a radiating tile designated 610 is in row 1, column A, and its identity may be designated 1A. Similarly, the tile designated 612 may be identified as 1B. The tile at the lower right corner of 8×8 array 446 is tile 8H. The broad side of radiating tile 610 which is visible in FIG. 6 is the feed side, and the four edges $610_1$, $610_2$, $610_3$, and $610_4$ are designated.

In FIG. 6, the eight input signal paths 401, 402, 403, 404, 405, 406, 407, and 408 are in the form of small-diameter coaxial transmission line (coax). While these coaxial transmission lines are illustrated exploded away from the support frame 50, they actually run along the support beams 50x, 50y, as suggested by lines 601, 602 lying along the support beams. These eight transmission lines carry received signals from receive antenna array 434 of FIG. 4 to the receivers or downconverters, upconverters, and gain controls of the communication system, all of which are contained within the spacecraft body. In FIG. 6, coax transmission line 401 carries receive signals to a 1:16 power divider or splitter 620a, which divides the received signals into sixteen signals, which are coupled by coaxial cables, illustrated as lines, to one input port (small circles) of each of radiating tiles 1E, 1F, 1G, 1H, 2E, 2F, 2G, 2H, 3E, 3F, 3G, 3H, 4E, 4F, 4G, and 4H, so that the signal on received RF signal path 401 is made available to all sixteen tiles of one-quarter of the 8×8 panel 24a of FIG. 6. Similarly, the receive signals on signal path 402 are divided by another sixteen-to-one divider 620b, and the resulting power-divided signals are each applied to a second input port of each of tiles 1E, 1F, 1G, 1H, 2E, 2F, 2G, 2H, 3E, 3F, 3G, 3H, 4E, 4F, 4G, and 4H. Thus, each of the abovementioned tiles receives a signal in first and second channels, and those signals are, in general but not always at two different frequencies within the overall band of the transmit tiles, which in the embodiment so far described is $K_u$ band. Similarly, the received signals on coaxial signal paths 403 and 404 are divided in dividers 622a and 622b, and routed to the input ports of radiating tiles 1A, 1B, 1C, 1D, 2A, 2B, 2C, 2D, 3A, 3B, 3C, 3D, 4A, 4B, 4C, and 4D. The received signals on coaxial signal paths 405 and 406 are divided in signal splitters 624a and 624b, and routed to the input ports of radiating tiles 5A, 5B, 5C, 5D, 6A, 6B, 6C, 6D, 7A, 7B, 7C, 7D, 8A, 8B, 8C, and 8D. The received signals on coaxial signal paths 407 and 408 are divided in signal splitters 626a and 626b, and routed to the input ports of radiating tiles 5E, 5F, 5G, 5H, 6E, 6F, 6G, 6H, 7E, 7F, 7G, 7H, 8E, 8F, 8G, and 8H. In a preferred embodiment of the invention, the input coaxial transmission lines, such as 401 and 402, are larger in diameter (0.085 inch diameter) than those extending from splitters 620a, 620b, to the input ports of the radiating tiles (0.047 inch diameter). The losses occasioned by the use of such coaxial transmission lines is readily made up by adjustment of the gain or level controls 444 of each tile.

Figure 7A:
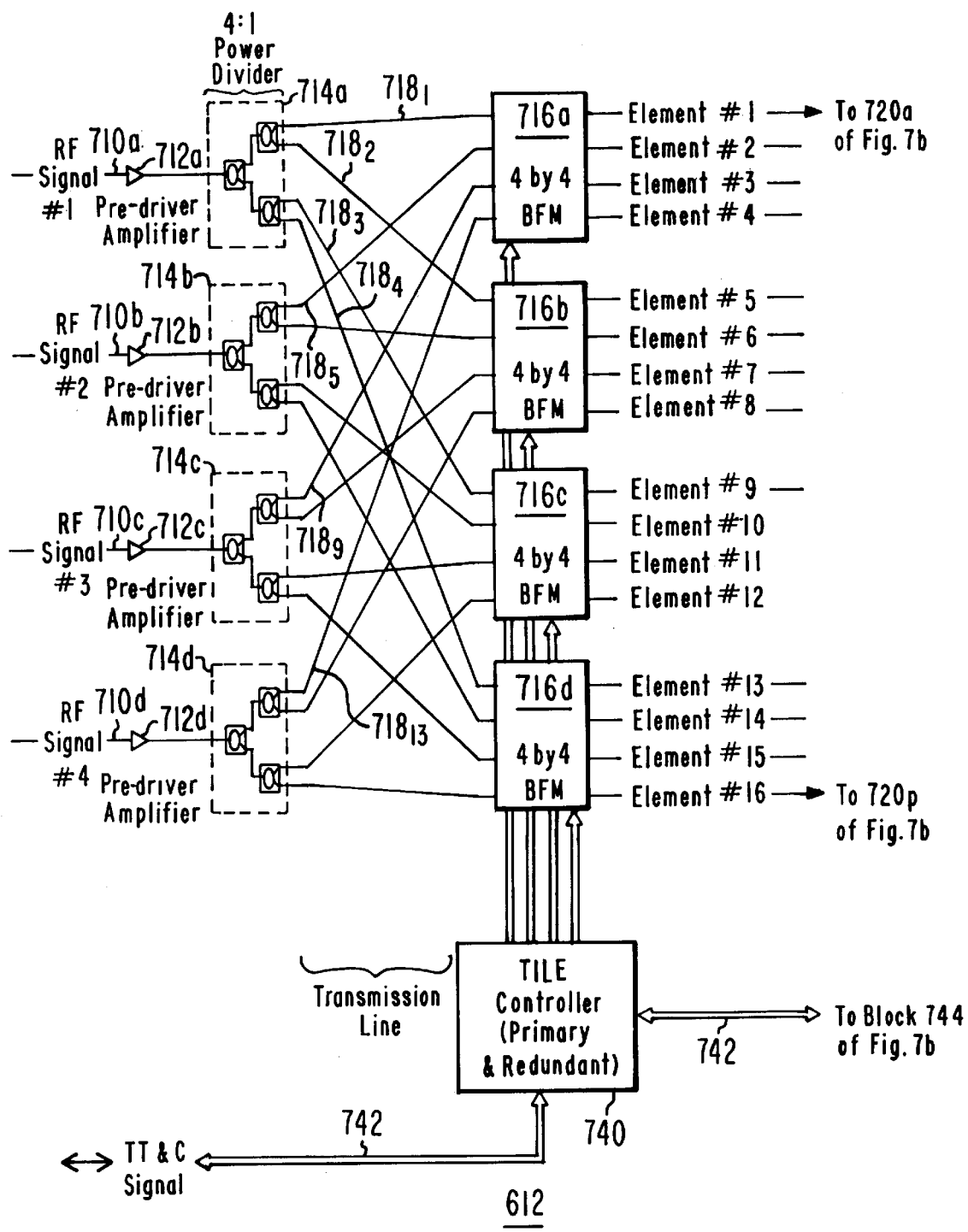
FIG. 7 is a simplified block diagram of the RF signal processing within one of the radiating tiles of FIG. 6.
Figure 7B:
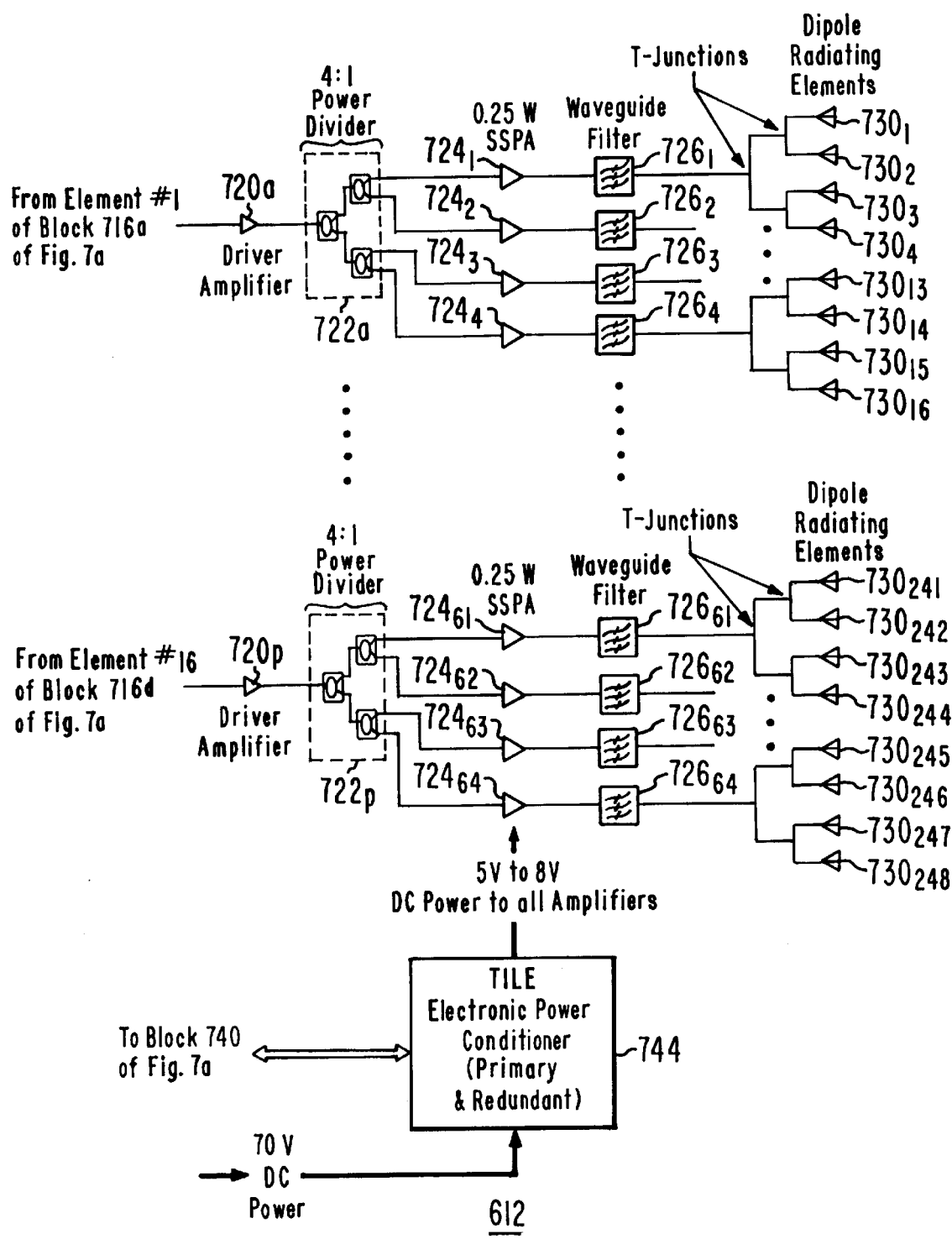

FIG. 7 is a simplified block diagram of the signal processing within a radiating tile, such as tile 612 at location 1B of FIG. 6. Since one of the purposes of the invention is to allow the use of common elements, each element may have greater capability than that which is used in a particular configuration. For example, while the configuration described in conjunction with FIG. 4 uses two RF input ports of each tile, the tiles themselves may have a greater number of input ports, so that they may be used in more complex configurations. In FIG. 7, the radiating tile includes four RF input ports 710a, 710b, 710c, and 710d. Each RF input port is coupled to an RF pre-driver amplifier to help with making up the cable losses, so input port 710a is coupled to an RF amplifier 712a, input port 710b is coupled to an RF amplifier 712b, input port 710c is coupled to an RF amplifier 712c, and input port 710d is coupled to an RF amplifier 712d. Each predriver is coupled to a 4:1 power divider. Thus, predriver 712a is coupled to a splitter 714a, predriver 712b is coupled to a splitter 714b, predriver 712c is coupled to a splitter 714c, and predriver 712d is coupled to a splitter 714d.

In FIG. 7, each 4:1 power splitter or divider 714 has each of its output ports coupled to an input port of a different one of four beamformers. Thus, a first output port of power divider 714a is coupled to an input port of a first beamformer 716a by way of a path $718_1$, a second output port of power divider 714a is coupled to an input port of a second beamformer 716b by way of a path $718_2$, a third output port of power divider 714a is coupled to an input port of a third beamformer 716c by way of a path $718_3$, and a fourth output port of power divider 714a is coupled to an input port of a fourth beamformer 716d by way of a path $718_4$. Beamformers are well known in the art, and details of a beamformer appear below.

Each beamformer 716a, 716b, 716c, and 716d of FIG. 7 has four output ports, each of which is coupled to an antenna array. For example, beamformer 716a has four output ports designated 1, 2, 3, and 4. output port 1 of beamformer 716a is coupled through a driver amplifier 720a to a further 4:1 power divider 722a. The four output ports of power divider 722a are applied to four corresponding power RF amplifiers $724_1$, $724_2$, $724_3$, $724_4$. The amplified signals from each power amplifier are applied through a bandpass filter, which rejects out-of-band RF power in the receive bands of all receive tiles, thus allowing simultaneous transmission and reception of signals by the communications spacecraft. In the illustrated embodiment, the bandpass filter is a waveguide filter. Thus, the output of RF amplifier $724_1$, is applied through waveguide filter $726_1$, and then by way of tee junctions to four individual radiating elements $730_1$, $730_2$, $730_3$, and $730_4$ of the antenna array 730 which is associated with radiating tile 612. In a particular embodiment of the invention, the individual radiating elements are dipoles, which are mounted on the RF-radiating side of tile 612, opposite to the side with the RF input ports. The output of RF amplifier $724_4$ is applied through waveguide filter $726_4$, and then by way of tee junctions to four individual radiating elements $730_{13}$, $730_{14}$, $730_{15}$, and $730_{16}$ of the antenna array 730 which 13 associated with radiating tile 612. The other two output ports of power divider 722a are coupled through power amplifiers $724_2$ and $724_3$, and through waveguide filters $726_2$ and $726_3$, respectively, to additional four-dipole subarrays of antenna array 730. Thus single output port of beamformer 716a couples four weighted signels to sixteen elementals dipole antenna elements.

Output port 16 of beamformer 716d of FIG. 7 is coupled through a driver amplifier 720p to a further 4:1 power divider 722p. The four output ports of power divider 722p are applied to four corresponding power RF amplifiers $724_{61}$, $724_{62}$, $724_{63}$, $724_{64}$. The amplified signals from each power amplifier are applied through a bandpass filter. In the illustrated embodiment, the bandpass filter is a waveguide filter. Thus, the output of RF amplifier $724_{61}$ is applied through waveguide filter $726_{61}$, and then by way of tee junctions to four individual radiating elements $730_{241}$, $730_{242}$, $730_{243}$, and $730_{244}$ of the antenna array 730. The output of RF amplifier $724_{64}$ is applied through waveguide filter $726_{64}$, and then by way of tee junctions to four individual radiating elements $730_{253}$, $730_{254}$, $730_{255}$, and $730_{256}$ of the antenna array 730 which is associated with radiating tile 612. The other two output ports of power divider 722p are coupled through power amplifiers $724_{62}$ and $724_{63}$, and through waveguide filters $726_{62}$ and $726_{63}$, respectively, to additional four-dipole subarrays of antenna array 730. Each beamformer output port lying between ports 1 and 16 is coupled in a similar manner. Thus, the sixteen output ports of beamformer 716a produce phase and attenuation weighted signal elements which results in formation of four beams. As is known to those skilled in the art, the phasing of the signals produced by the beamformers can be adjusted, to move the radiated beams in space. In FIG. 7, a controller 740 receives command signals over a signal path 742 from outside the tile, and is coupled to the beamformers 716 for control of the phasing. A further controllerin the electronic power conditioner 744 is coupled to receive commands from outside tile 612, also by way of signal path 742, and is coupled to the RF amplifiers 724 for control of their output power level. This is readily accomplished in many different ways, one of which is simply to reduce the applied energizing voltage.

Figure 8:
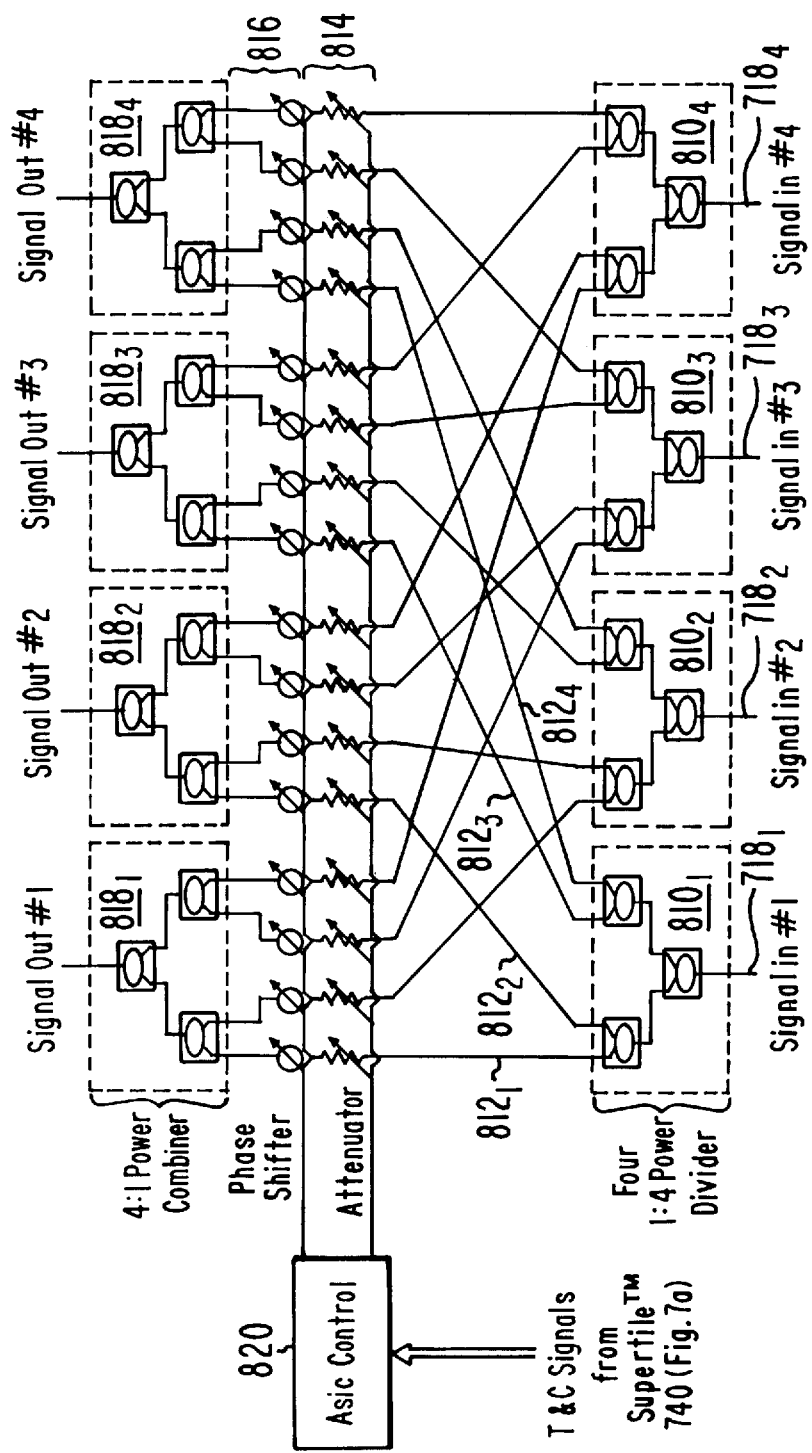
FIG. 8 is a simplified block diagram of a beamformer which may be used in the arrangement of FIG. 7.

FIG. 8 is a simplified block diagram of an exemplary beamformer of FIG. 7. For definiteness, beamformer 716a is illustrated. In FIG. 8, the input signals on signal paths $718_1$, $718_5$, $718_9$, and $718_{13}$ are each applied to a 4:1 power splitter. More specifically, the signal on path $718_1$, is applied to a 4:1 power divider $810_1$, which includes an input 2:1 power divider cascaded with a pair of additional 2:1 power dividers, so as to produce four power-divided signals on signal paths $812_1$, $812_2$, $81_{23}$, and $81_{24}$. Each of the power-divided signals on a signal path 812 is applied to an attenuator of an attenuator array 814. The attenuated signals are applied from each individual attenuator to a corresponding phase shifter of an array 816 of phase shifters. The attenuated and phase-shifted signals are recombined in 1:4 power combiners $818_1$, $818_2$, $818_3$, and $818_4$, with four resulting output signals with contributions from their four source signals. Such beamformers are so well known that no further description is believed to be necessary. Since the attenuators and phase shifters illustrated in FIG. 8 are all located on a single individual radiating tile of an array, it is desirable to have remote control of the attenuators and phase shifters, which is provided by a controller 820, which receives its digital commands from controller 740 of FIG. 7.

In a preferred embodiment of the invention, the receive and the transmit tiles are preferably of a common size so that they may be substituted into various locations in the support frame. The preferred dimension is a square of about 12 inches by 12 inches, with a thickness of not more than about 1.2 inches, for a 10:1 ratio of side/thickness. In order to fit the necessary signal processing of FIGS. 7 and 8 into the available space, an integrated structure is desirable.

Figure 9:
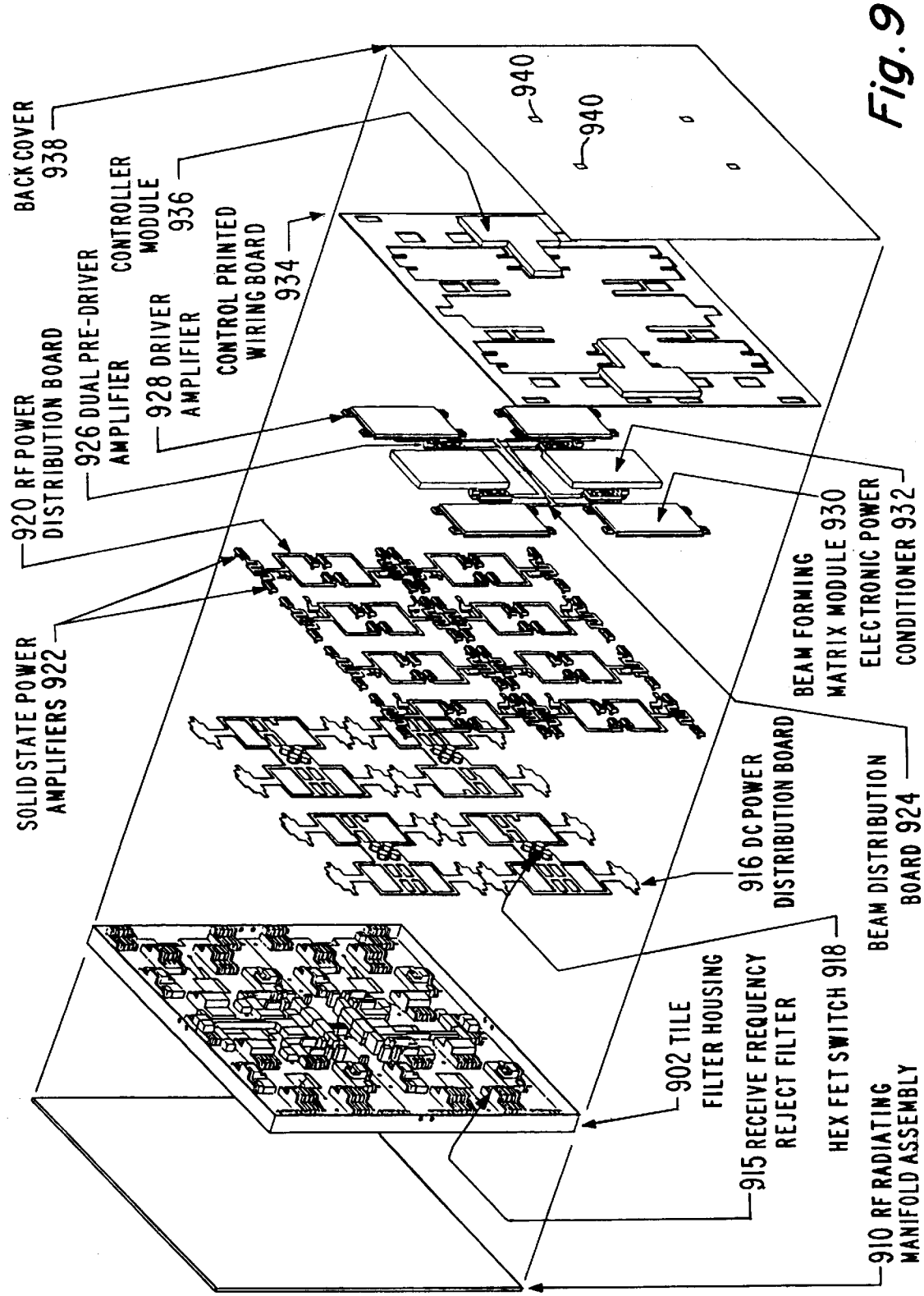
FIG. 9 is a simplified, exploded view of a portion of a radiating tile according to an aspect of the invention, illustrating how the various parts are fitted.

FIG. 9 is an exploded view of a single radiating tile. In FIG. 9, 910 is a manifold assembly, described below, which forms the radiating surface of the tile of FIG. 9. Manifold 910 also radiates thermally, and is the outer cover or outer conductor for the 4:1 splitters which drive the radiating elements, and the broad wall of the bandpass filters. A tile filter housing 912 is the principal structural support for the tile. The tile filter housing 912 is made from a metal, and is therefore thermally conductive, and includes machined elements which define the bandpass filters 726 of FIG. 7. One of the machined filter elements 726 is illustrated from the "back" side as 915 in FIG. 9. A strip conductor 916 is patterned to fit within interstices of filter housing 912 to define the distribution path for energizing power to various locations. HEXFET DC power switches, one of which is designated 918, each provide for the switching on and off of groups of four power amplifiers 724 of FIG. 7. Power amplifiers 724 are illustrated as 922 in FIG. 9. The RF signal distribution is accomplished by a stripline transmission line pattern 920, which provides signal paths between each driver amplifier 928, and four corresponding power amplifiers 922 of the tile. The driver amplifiers 928 are illustrated as 720 in FIG. 7. The power amplifiers are physically mounted in thermal communication with filter housing 912. Another layer F 916 illustrated in FIG. 9 includes pre-driver amplifiers 926 and driver amplifiers 928, and the beamforming matrices 930. The pre-driver amplifiers 926 are illustrated as 712 in FIG. 7. The beamforming matrices are illustrated as 716 in FIG. 7. This layer also includes the power conditioning 932 for control 717 of the power amplifier output level. A further At layer includes a printed-circuit pattern 934 for carrying the low-level control signals, and a controller module. A back cover 938 includes representative apertures 940 for RF signal ingress ports, energizing power input, control signal inputs, and the like. Interconnection between the various layers of the structure of FIG. 9 may be accomplished in any desired manner. In a preferred embodiment of the invention, short metal ribbons extending "horizontally" between pads on the various layers are used for many of the RF signal connections. The pads have coplaner stripline terminations in the preferred embodiment.

Figure 10:
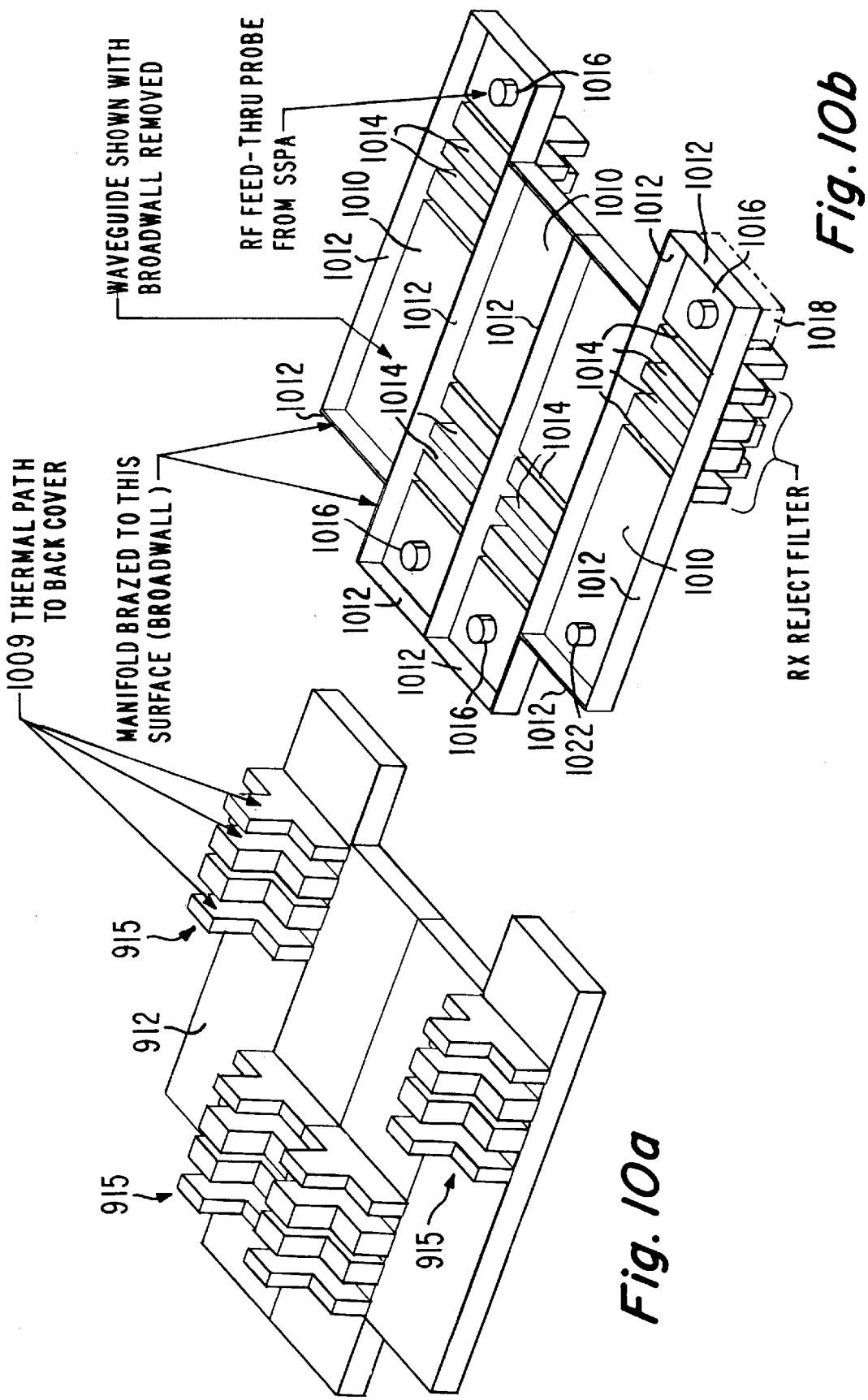

FIG. 10a illustrates a portion of the structure of FIG. 9, showing the reverse sides of three filter elements 915, and illustrating the thermal paths 1009 provided between the main AC I/z?/4 filter housing 912 and portions of the radiating tile closer to back cover 938, which is part of a conducting path which extends all the way from filter housing 912 to back cover 938. FIG. 10b illustrates the reverse side of the portion of the filter housing 912 from that of FIG. 10a. In FIG. 10b, the waveguides 1010 defined in part by narrow side walls 1012 are interrupted by the cavities 1014 of the RF filters. The upper walls of the waveguides 1010 of the filters are defined by the abovementioned manifold, described below. In FIG. 10b, the feedthroughs or probes from the associated solid state power amplifiers 922 of FIG. 9 (SSPAs) are illustrated as 1016. The physical mounting location of one of the solid state power 3 amplifiers is illustrated as 1018. Thus, the heat produced by the SSPA in location 1018 is conducted directly to the filter housing 912, and by the abovementioned thermal paths to the back cover 938. Further conductive thermal paths to the manifold, described below, are provided by the narrow side walls 1012 of the waveguides 1010. Energy coupled into each waveguide 1010 from an SSPA by way of a coupling probe 1016 propagates past the cavities (if at the proper frequency) to the opposite end of the waveguide, and is coupled out to the manifold by a probe or coupler at locations such as 1022.

Figure 11:
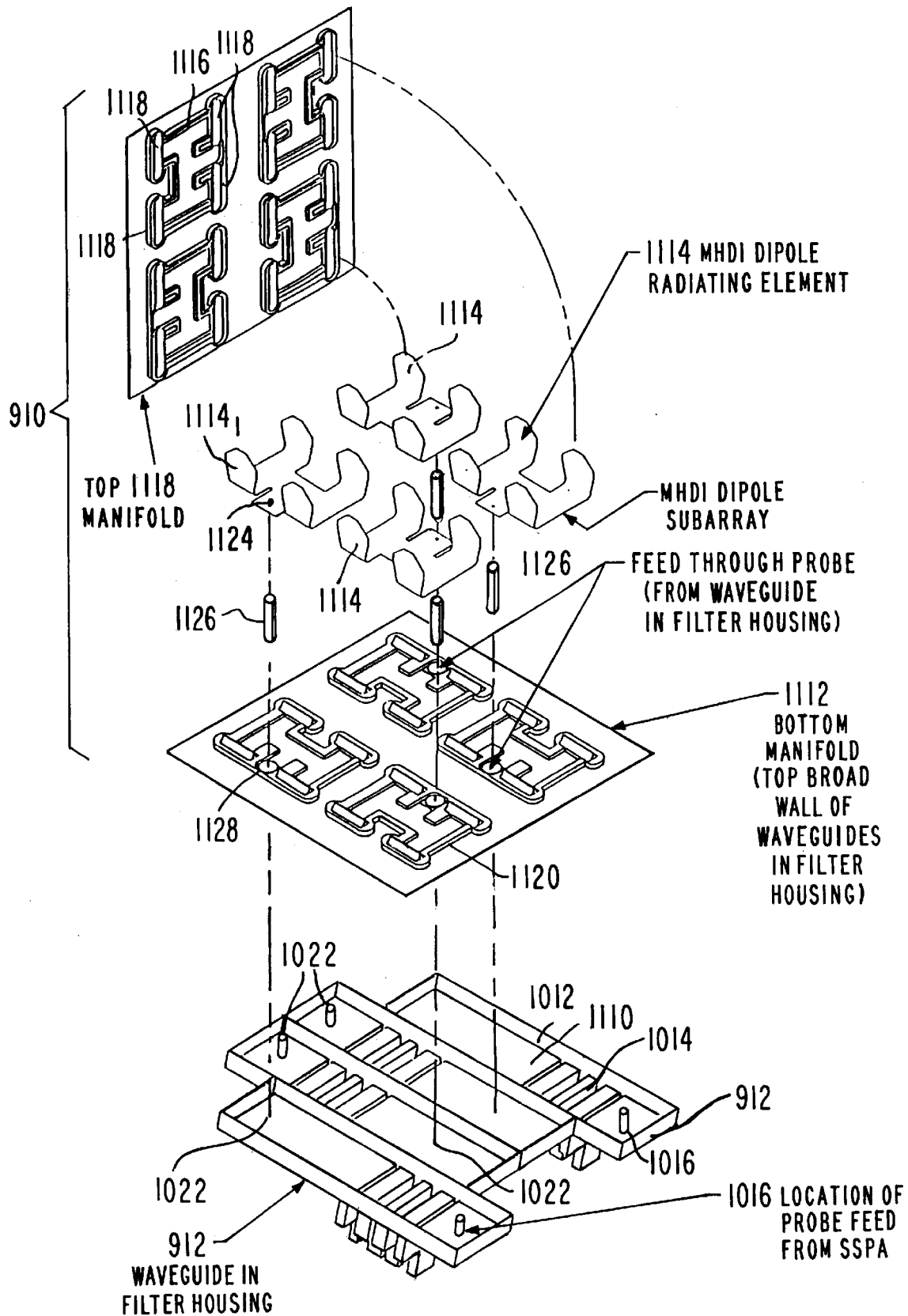
FIG. 11 is a simplified, exploded view of a portion of a manifold, illustrating how it is placed relative to the underlying filter housing, and also illustrating how RF power is distributed to the radiating elements.

FIG. 11 is an exploded view of a portion of the manifold 910 of FIG. 9. In FIG. 11, manifold 910 is seen to be made up of a top manifold 1110, a bottom manifold 1112, and a plurality of multiple-dipole radiating elements, each of which is designated 1114. Upper manifold 1110 defines a plurality of walls, one of which is designated 1116, adjacent to each set of four through slots or apertures 1118. The apertures 1118 allow the dipole antennas to extend out of the tile for radiation. The walls, such as wall 1116, associated with each set of four apertures 1118, coact with corresponding walls 1120 of the bottom manifold 1112 to define peripheral walls, which in turn coact with the electrically conductive patterns defined on elements 1114 to form a low-profile four-way power splitter. For example, radiating elements $1114_1$ consists of a plurality of flexible layers of dielectric material, with various conductive layers. The four radiating elements of structure $1114_1$ are fed from the outputs of the four-way power divider defined by the flexible conductors in conjunction with peripheral walls 1116 and 1120. The input to the power divider formed from the flexible conductors and peripheral walls is at a point 1124 on each radiating element structure. From each point 1124, a conductor wire such as wire 1126 extends "downward" through an aperture 1128 in the bottom manifold 1112, and projects into the associated filter waveguide at point 1022. Thus, the four-way splitter associated with each set of four radiating dipoles is fed by a probe 1126 from the end of an associated filter waveguide. The dipole elements are in the form of conductive patterns on the flexible dielectric material, and are arranged with insulation of the dipole elements where they pass through slot apertures 1118. A conductive thermal path extends from filter housing 912 through the thin walls 1012 into contact with bottom manifold 1112, and through the projecting peripheral walls 1120 to matching peripheral walls 1116 of top manifold 1110. The large number of such paths provides a relatively low thermal resistance.

Figure 12:
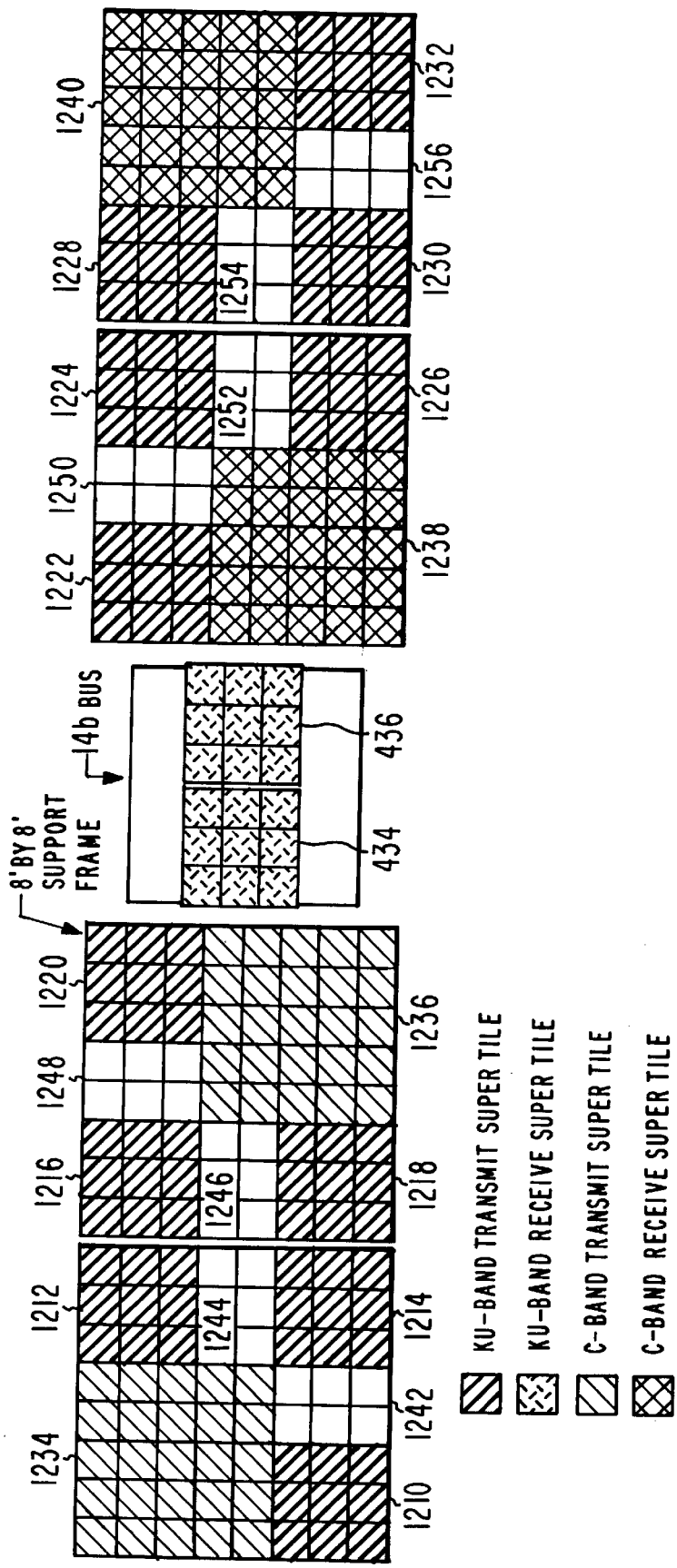
FIGS. 12 and 13 illustrate layouts of tiles in particular embodiments of the invention.

FIG. 12 illustrates the layout of tiles in a particular embodiment of the invention. In FIG. 12, 434 and 436 are mutually orthogonally linear polarized $K_u$ band receive antennas, much as described in conjunction with FIG. 5. Three-by-three tile arrangements 1210, 1212, 1214, 1216, 1218, 1220, 1222, 1224, 1226, 1228, 1230, and 1232 are $K_u$ transmit arrays. Among these, six are vertically polarized, and the other six are horizontally polarized. Five-by-five tile sets 1234 and 1236 are C-band transmit antenna arrays, while five-by-five tile sets 1238 and 1240 are C-band receive antenna arrays. The receive antenna arrays are much easier to build, because they don't contain numbers of high-power RF amplifiers, but instead include only low-noise amplifiers. Two-by-three tile sets 1242, 1244, 1246, 1248, 1250, 1252, 1254, and 1256 are nonradiating dummy tiles to aid in support of the tile support frame.

Figure 13:
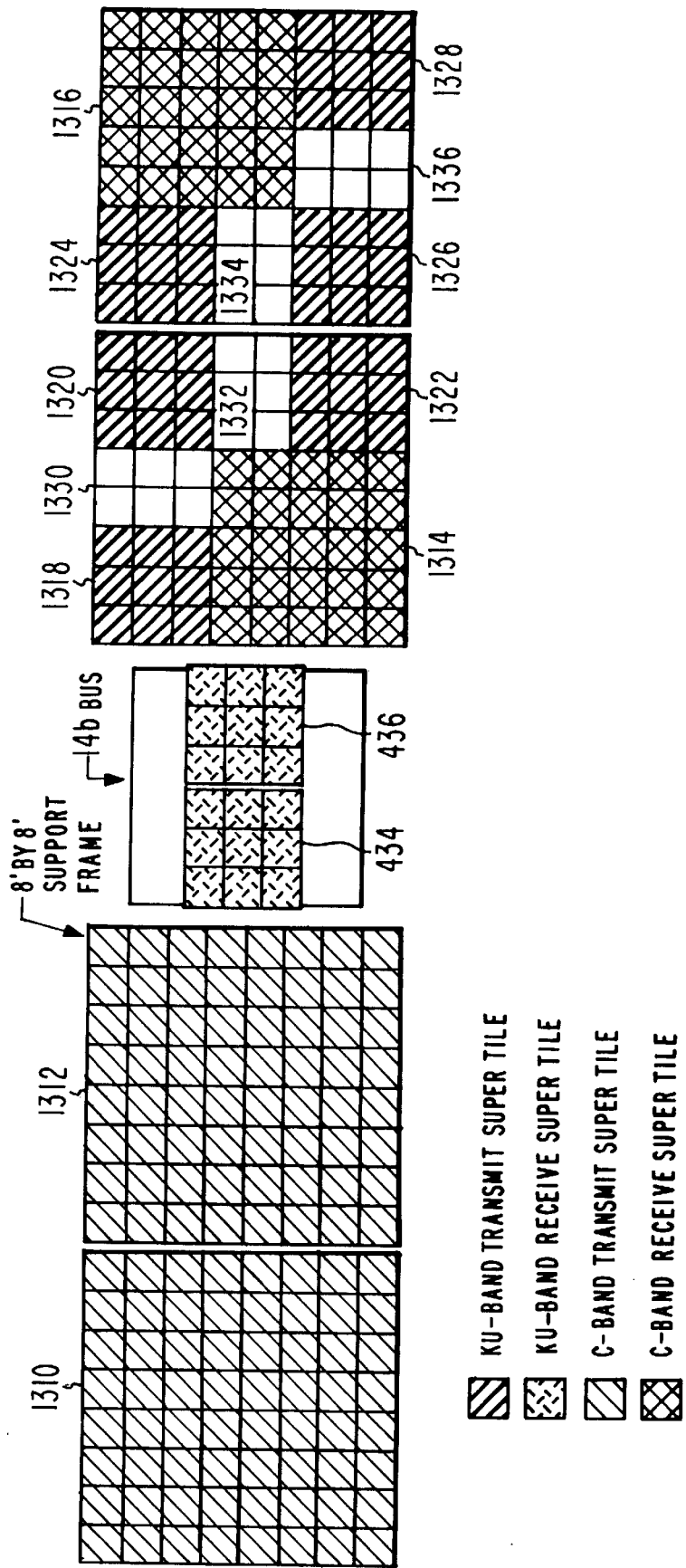

FIG. 13 illustrates the tile layout according to another embodiment of the invention. In FIG. 13, 1310 represents a first 8×8 tile C-band transmit array, and 1312 is a second 8×8 tile C-band transmit array. Five-by-five tile sets 1314 and 1316 represent C-band receive arrays. Three-by-three tile sets 1318, 1320, 1322, 1324, 1326, and 1328 are $K_u$ band transmit arrays. Three-by-three tile sets 434 and 436 are $K_u$ band receive arrays mounted on the nadir side of the body 14b of the spacecraft bus. As in the case of the arrangement of FIG. 12, those apertures in the frame which are not occupied by radiating tiles, namely two-by-three tile sets 1330, 1332, 1334, and 1336 are occupied by dummy tiles for mechanical support.

Figure 14:
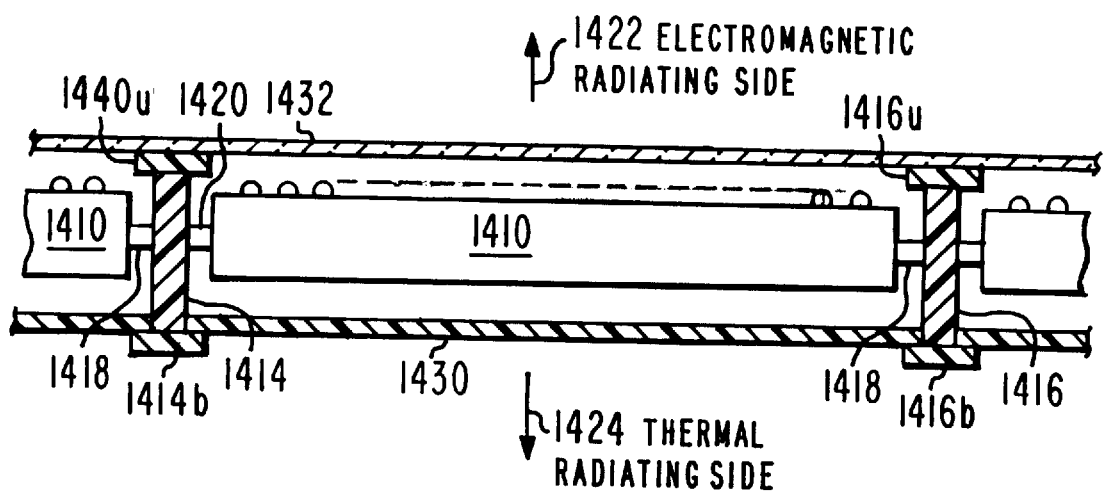
FIG. 14 is a cross-sectional representation of a receive-only tile, with thermal reflectors to keep it warm.

FIG. 14 is a cross-sectional side view of a receive-only tile mounted in a support frame, with heat-reflecting insulation to aid in maintaining temperature. In FIG. 14, the receive-only radiating tile is designated 1410, and two adjacent frame beam webs or support members are 1412 and 1414. Web 1414 has upper flange 1414u and lower flange 1414b, and web 1416 has flanges 1416u and 1416b. Tile supports 1418 and 1420 support the tile within the aperture defined by the frame members. The electromagnetic radiating side is indicated by arrow 1422. The thermal-only radiating side is indicated by arrow 1424. Thermal radiation from the lower broad side of tile 1410, which would otherwise be lost to space, is reflected back to the tile by a first thermal shield or blanket 1430, which may be as simple as a thin sheet of polymer metallized on one side for thermal reflection. Aluminum, silver or gold metallization may be used. On the electromagnetic radiating side 1422, the thermal reflector or blanket 1432 must be RF-transparent. Many such RF-transparent thermal shields are known, such as that described in U.S. Pat. No. 5,215,824, issued Jun. 1, 1993 in the name of Munro, III, et al, and that described in U.S. Pat. No. 5,283,592, issued Feb. 1, 1994 in the name of Bogorad et al.

Thus, each spacecraft (12, 14, 16) of a set (10) of spacecraft according to the invention includes a body (12b, 14b, 16b), and a source of electrical power (40a, 40b; 44) mounted on the body. The body (12b, 14b, 16b) of each of the spacecraft bears a support frame (50), which comprises a plurality of elongated support beams (50x, 50y) in first and second mutually orthogonal sets, joined together to form a substantially planar grid (50) defining an array of substantially identical rectangular apertures (28). The sizes of the rectangular apertures (28) are identical from one spacecraft of the set to another. A first spacecraft (14) of the set of spacecraft (10) includes a first set (30) of substantially planar, rectangular, first tiles (30$_x$), where the subscript x refers to any or all of the abovementioned or above-described numerals. Each of the first tiles defines first and second broad sides and four edges (610$_1$, 610$_2$, 610$_3$, and 610$_4$), and each tile of the first set (30) of tiles is dimensioned to fit within any one of the rectangular apertures (28) of the frame (50) of any spacecraft (12, 14, 16) of the set (10) of spacecraft. Each of the first tiles (30$_x$ of FIG. 1) includes an antenna arrangement (730 OF FIG. 7) which is adapted for electromagnetic radiation from the first broad side of the tile within a first frequency band. Each of the first tiles includes an electromagnetic signal input port (710$_x$ of FIG. 7) for receiving signals within the first frequency band, an amplifier (724$_x$) for amplifying signals within the first frequency band, a coupling arrangement (712$_x$, 714$_x$, 718$_x$, 716$_x$, 720$_x$, 722$_x$ coupled to the amplifier (724$_x$) and to the electromagnetic signal input port (710$_x$), for coupling signals which are applied to the electromagnetic signal input port (710$_x$) to the amplifier (724$_x$) for amplification, and a reject filter arrangement (726$_x$) coupled to the amplifier (724$_x$) and to the antenna arrangement (730), for coupling amplified signals from the amplifier (724$_x$) to the antenna arrangement (730), and for rejecting signal components at reject frequencies other than the first frequency band. The amplifiers (724$_x$) of each of the first tiles is thermally coupled to at least one of the first and second broad sides of the tile for radiation of thermal energy into space therefrom. Each of the tiles of the first set (30) of tiles is mounted within one of the apertures (28) in the frame (50) of the first spacecraft (14), with at least one edge 610, of each of the tiles of the first set of tiles adjacent to another tile of the first set of tiles, to thereby form an active array which includes the antenna arrangements of the first set of tiles. The first spacecraft also includes a second set (32) of substantially planar, rectangular, second tiles. Each of the second tiles

(32) defines first and second broad sides and four edges, and is dimensioned to fit within any one of the rectangular apertures of the frame of any spacecraft of the set of spacecraft. Each of the second tiles includes an antenna arrangement which is adapted for radiation from the first side of the tile within a second frequency band. Each of the second tiles (32) includes an electromagnetic signal input port (710$_x$)for receiving signals within the second frequency band, an amplifier (724$_x$) for amplifying signals within the second frequency band, a coupling arrangement (712$_x$, 714$_x$, 718$_x$, 716$_x$, 720$_x$, 722$_x$) coupled to the amplifier and to the electromagnetic signal input port for coupling those signals which are applied to the input port to the amplifier in which the signals are amplified, and a reject filter arrangement (726$_x$) coupled to the amplifier and to the antenna arrangement, for coupling amplified signals from the amplifier to the antenna arrangement, and for rejecting signal components at reject frequencies other than the second frequency band. The amplifier of each of the second tiles is thermally coupled to at least one of the first and second sides of its associated second tile, for radiation of thermal energy therefrom. Each of the tiles of the second set of tiles is mounted within one of the apertures in the frame of the first spacecraft, with at least one edge of each of the tiles of the second set of tiles adjacent to another tile of the second set of tiles, to thereby form an active array which includes the antenna arrangement of the second set of tiles. The first spacecraft further includes a source of first electromagnetic signals within the first frequency band, and a source of second signals within the second frequency band. The first and second signals are to be transmitted. The first spacecraft further includes a first power divider (622$a$, 622$b$) with an input port coupled to the source of first signals. The first power divider includes a plurality of output ports, each of which is coupled to the electromagnetic signal input port of one of the tiles of the first set of tiles. The first spacecraft also includes a second power divider with an input port coupled to the source of second signals, and with a plurality of output ports, each of the which is coupled to an the electromagnetic signal input port of one of the tiles of the second set of tiles. The first spacecraft further includes an electrical power distributing arrangement coupled to the source of electrical power and to each of the tiles, for providing energizing power for the amplifier. In a preferred embodiment of the invention, the rectangular apertures in the frame are square, and the tiles are also square, so that the tiles may be mounted with either of two mutually orthogonal linear polarizations. The tiles preferably has a minimum ratio of side to thickness of 10, and in one embodiment have 12-inch sides. In another embodiment of the invention, the radiation associated with the first tile of the first spacecraft is in a first polarization, and the radiation associated with the second tile is in a second polarization, orthogonal to the first polarization. The frequency of operation of a tile may be within or include C-band, L-band, X-band, or any of the K bands, or combinations thereof. Mutually adjacent tiles in the frame may operate within the same frequency band, or at different frequency bands. The electrical power distribution arrangement may distributes the electrical power at a distribution voltage which exceeds that required by the amplifier, and each of the tiles may in that case include a voltage reducer coupled to the power distribution and to the amplifier, for reducing the distribution voltage to a lower voltage for application to the amplifier. Those skilled in the art know that this may be done in a linear manner, but that a switching voltage converter tends to have lower energy or power losses.

Other embodiments of the invention will be apparent to those skilled in the art. For example, instead of having four RF input ports per tile, there may be one, two, three, or more than four RF input ports on each tile, depending upon the number of beams associated with each tile. While the number of independent beams been described as sixteen when there are sixteen channels, some or all of the beams may wholly or partially overlap. While active devices or amplifiers through which multiple signals pass are desirably maintained within their linear regions to reduce the effects of distortion, such as cross-modulation and intermodulation, linear amplifiers always have some residual distortion at any operating level. Those skilled in the art know that the operating level of the active device or amplifier itself may be nonlinear if a predistortion or postdistortion device is cascaded therewith to reduce the effects of the distortion occasioned by operating in a nonlinear portion of the device characteristics. While the apertures in the support frame and the tiles have been described as being square, those skilled in the art will recognize that other shapes are also possible, namely rectangular or hexagonal. While the $K_u$ band tile has been described as having 256 radiating elements, when lower frequencies are used, the larger physical dimensions of the various parts, such as the filters, necessarily reduces the number of radiators on each tile. While transmit-only or receive-only tiles have been described, transmit-receive tiles may be used, with the transmit and receive frequencies either the same or different.

What is claimed is:

1. A spacecraft of a set of spacecraft, each of said spacecraft comprising:

a body;

a source of electrical power;

a support frame supported by said body, said frame comprising a plurality of elongated support beams in first and second mutually orthogonal sets, joined together to form a substantially planar grid defining an array of substantially identical rectangular apertures;

a first set of substantially planar, rectangular, first tiles, each of said first tiles defining first and second broad sides and four edges, each tile of said first set being dimensioned to fit within any one of said rectangular apertures, and each of said first tiles including antenna means which is adapted for radiation from said first side of said tile within a first frequency band, and which is arranged for electromagnetic radiation from said first side of said tile, each of said first tiles including an electromagnetic signal input port for receiving signals within said first frequency band, amplification means for amplifying signals within said first frequency band, coupling means coupled to said amplification means and to said input port for coupling signals which are applied to said input port to said amplification means for amplification, and reject filter means coupled to said amplification means and to said antenna means, for coupling amplified signals from said amplification means to said antenna means, and for rejecting signal components at reject frequencies other than said first frequency band, said amplification means of each of said first tiles being thermally coupled to at least one of said first and second sides for radiation of thermal energy therefrom, each of said tiles of said first set of tiles being mounted within one of said apertures in said frame, with at least one edge of each of said tiles of said first set adjacent to another tile of said first set, to thereby form an active array including said antenna means of said first set of tiles;

a second set of substantially planar, rectangular, second tiles, each of said second tiles defining first and second broad sides and four edges, each tile of said second set being dimensioned to fit within any one of said rectangular apertures, and each of said second tiles including antenna means which is adapted for radiation from said first side of said tile within a second frequency band, and which is arranged for electromagnetic radiation from said first side of said tile, each of said second tiles including an electromagnetic signal input port for receiving signals within said second frequency band, amplification means for amplifying signals within said second frequency band, coupling means coupled to said amplification means and to said input port for coupling signals which are applied to said input port to said amplification means for amplification, and reject filter means coupled to said amplification means and to said antenna means, for coupling amplified signals from said amplification means to said antenna means, and for rejecting signal components at reject frequencies other than said second frequency band, said amplification means of each of said second tiles being thermally coupled to at least one of said first and second sides for radiation of thermal energy therefrom, each of said tiles of said second set of tiles being mounted within one of said apertures in said frame, with at least one edge of each of said tiles of said second set adjacent to another tile of said second set, to thereby form an active array including said antenna means of said second set of tiles;

a source of first signals within said first frequency band, which first signals are to be transmitted;

a source of second signals within said second frequency band, which second signals are to be transmitted;

first power dividing electromagnetic transmission means including an input port coupled to said source of first signals, and including a plurality of output ports, each of said output ports of said first power dividing means being coupled to said electromagnetic signal input port of one of said tiles of said first set of tiles;

second power dividing electromagnetic transmission means including an input port coupled to said source of second signals, and including a plurality of output ports, each of said output ports of said second power dividing means being coupled to said electromagnetic signal input port of one of said tiles of said second set of tiles; and electrical power distributing means coupled to said source of electrical power and to each of said tiles, for providing energizing power for said amplification means.

2. A spacecraft according to claim 1, wherein said rectangular apertures and said rectangular radiating tiles are square.

3. A spacecraft according to claim 1, wherein each of said tiles has a minimum ratio of side to thickness of 10.

4. A spacecraft according to claim 1, wherein said radiation associated with said first tile is in a first polarization, and said radiation associated with said second tile is in a second polarization, orthogonal to said first polarization.

5. A spacecraft according to claim 1, wherein said first frequency band is C-band.

6. A spacecraft according to claim 1, wherein said second frequency band is K band.

7. A spacecraft according to claim 6, wherein said K band is $K_A$ band.

8. A spacecraft according to claim 6, wherein said K band is $K_u$ band.

9. A spacecraft according to claim 1, wherein said second frequency band is X-band.

10. A spacecraft according to claim 1, wherein each of said tiles is square, with edges of about 12 inches.

11. A spacecraft according to claim 1, wherein said electrical power distribution means distributes said electrical power at a distribution voltage which is higher than that required by said amplification means, and each of said tiles further includes voltage reducing means coupled to said power distribution means and to said amplification means for reducing said distribution voltage to a lower voltage for application to said amplification means.

12. A spacecraft of a set of spacecraft, each of said spacecraft comprising:

a body;

a source of electrical power;

a support frame supported by said body, said frame comprising a plurality of elongated support beams in first and second mutually orthogonal sets, joined together to form a substantially planar grid defining an array of substantially identical rectangular apertures;

a first set of substantially planar, rectangular, first tiles, each of said first tiles defining first and second broad sides and four edges, each tile of said first set being dimensioned to fit within any one of said rectangular apertures, and each of said first tiles including antenna means which is adapted for receiving electromagnetic radiation from said first side of said tile within a first frequency band, each of said first tiles including an electromagnetic signal output port at which signals received within said first frequency band are produced, low-noise amplification means for amplifying signals within said first frequency band, coupling means coupled to said amplification means and to said electromagnetic signal output port for coupling amplified received signals from said amplification means to said electromagnetic signal output port, and reject filter means coupled to said amplification means and to said antenna means, for coupling received signals from said antenna means to said amplification means, and for rejecting signal components at reject frequencies other than said first frequency band, said amplification means of each of said first tiles being thermally decoupled from at least one of said first and second sides for avoiding radiation of thermal energy therefrom, each of said tiles of said first set of tiles being mounted within one of said apertures in said frame, with at least one edge of each of said tiles of said first set adjacent to another tile of said first set, to thereby form an active array including said antenna means of said first set of tiles;

a second set of substantially planar, rectangular, second tiles, each of said second tiles defining first and second broad sides and four edges, each tile of said second set being dimensioned to fit within any one of said rectangular apertures, and each of said second tiles including antenna means which is adapted for receiving radiation from said first side of said tile within a second frequency band, each of said second tiles including an electromagnetic signal output port at which said received signals within said second frequency band appear, low-noise amplification means for amplifying signals within said second frequency band, coupling means coupled to said amplification means and to said output port for coupling amplified signals from said amplification to said output port, and reject filter means coupled to said amplification means and to said antenna means, for coupling received signals from said antenna means to said amplification means, and for rejecting signal components at reject frequencies other than said second frequency band, said amplification means of each of said second tiles being thermally decoupled from at least one of said first and second sides for reducing radiation of thermal energy therefrom, each of said tiles of said second set of tiles being mounted within one of said apertures in said frame, with at least one edge of each of said tiles of said second set adjacent to another tile of said second set, to thereby form an active array including said antenna means of said second set of tiles;

a sink of first signals within said first frequency band, which first signals are to be received, said sink of first signals being coupled to said first tile;

a sink of second signals within said second frequency band, which second signals are to be received, said sink of second signals being coupled to said second tile;

electrical power distributing means coupled to said source of electrical power and to each of said tiles, for providing energizing power for said amplification means; and a thermal shield thermally coupled to one of said first and second broad sides of one of said first and second tiles, for tending to keep said one of said tiles warm.

* * * * *